Sept. 22, 1942. L. THOMPSON Re. 22,183

APPARATUS FOR RECORDING SOUND ON THIN DISKS

Original Filed Dec. 15, 1938

INVENTOR
Lincoln Thompson.
BY
H. G. Manning
ATTORNEY

Reissued Sept. 22, 1942

Re. 22,183

UNITED STATES PATENT OFFICE 22,183

APPARATUS FOR RECORDING SOUND ON THIN DISKS

Lincoln Thompson, Cheshire, Conn., assignor to The Sound Scriber Corporation, Stamford, Conn., a corporation of Connecticut Original No. 2,200,866, dated May 14, 1940, Serial No. 245,944, December 15, 1938. Application for reissue December 17, 1941, Serial No. 423,335

5 Claims. (Cl. 274—9)

This invention relates to sound recording, and more particularly to an apparatus for recording sound on a thin disk record.

It has hitherto been considered impractical to make sound recordings on a thin flexible disk due to the fact that the surface of said disk would become permanently deformed and would warp so badly that it would not play back with satisfaction. Even when relatively thick aluminum disks of the order of .030" thickness (20# gauge) were embossed with sound grooves in the conventional recording machines, it was found that the disks showed some warpage after recording. This was due largely to the fact that the disk was mounted on a soft felt or yieldable rubber pad which permitted the heavy pressure of the embossing stylus (10 to 16 ounces) to bend the disk record into "dish" form. With thinner disks, this dishing or warping effect would naturally be greatly aggravated.

By means of the present invention, the above and other disadvantages have been overcome, and it has been found possible to emboss sound grooves in an extremely thin flexible disk record without appreciable warpage, using disks as thin as .006". This result has been accomplished by eliminating the soft felt or rubber pads previously used as a frictional foundation for the disk record, and in placing the record upon a solid and rigid turntable or plate mounted on said turntable. The tendency to produce warpage is still further reduced by employing a lower embossing pressure on the stylus, whereby a more shallow groove or sound track will be produced. At the same time, in order to drive the thin record without slippage, an interlocking connection is made between the record and the spindle of the turntable, as by providing a square driving recess in the center of the record for fitting over a similarly shaped section on said spindle.

By the use of this construction the thin record is supported rigidly so that it cannot bend below the point of the embossing stylus, yet permitting the latter to form a spiral groove in the surface of the record in a manner similar to the action of a plow.

One object of the present invention is to provide an apparatus by means of which extremely thin disk records between .006" and .015" may be readily embossed with sound grooves on both faces, without producing sufficient warpage as to interfere with the satisfactory playing back of the record.

A further object is to provide an apparatus by means of which a bendable semi-rigid record disk may be recorded which will not buckle up during recording when positively driven by the center spindle and without the necessity of clamping the record on the turntable.

A still further object of this invention is to provide an apparatus for recording on a thin semi-rigid metal disk which will be relatively inexpensive to manufacture, simple in construction, ornamental in appearance, and very efficient and durable in use.

With these and other objects in view, there have been illustrated on the accompanying drawing two forms of sound recording apparatus in which the invention may be conveniently embodied in practice.

Figure 1:
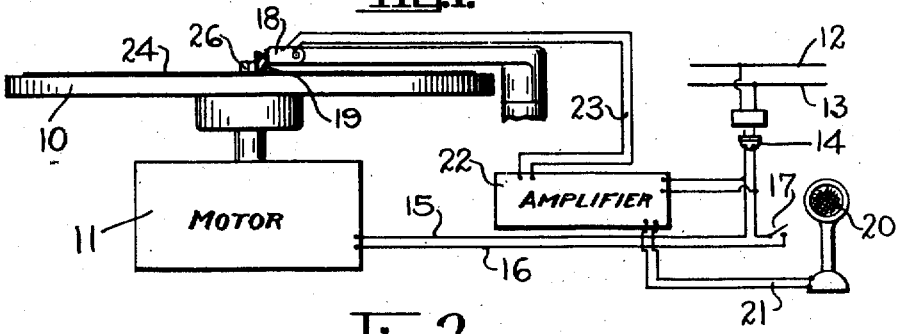
Figure 1 illustrates partly diagrammatically the first form of improved sound recording apparatus embodying the present invention.
Figure 2:
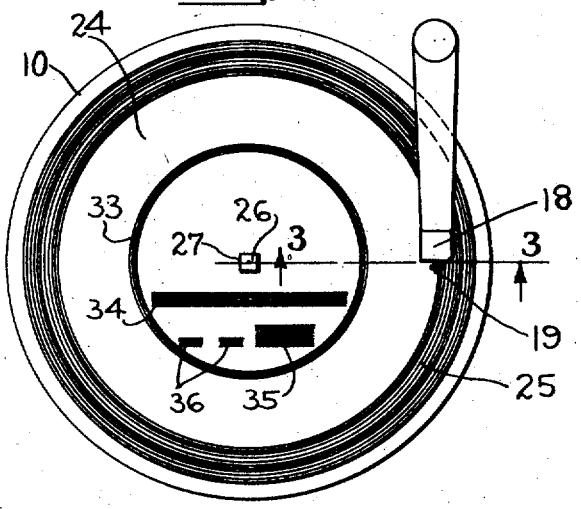
Figure 2 is a top plan view of the thin disk record as it appears when interlocked with the turntable spindle, and with the embossing stylus in operating position.
Figure 3:
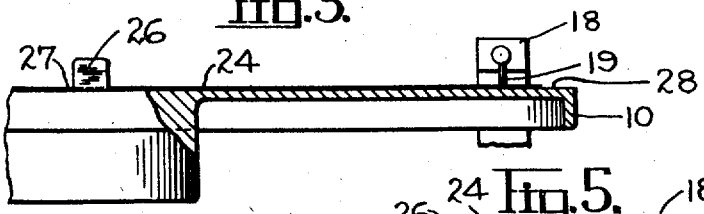
Figure 3 is an enlarged side view, partly in section, of the thin disk record turntable and embossing stylus shown in Figure 2, taken on the line 3—3 of Figure 2.

Referring now to the drawing wherein like reference numerals denote like parts throughout the several views, the numeral 10 designates a turntable which is adapted to be rotated by an electric motor 11 in the conventional manner. The motor 11 is adapted to be energized by being connected to a source of electrical energy through main line conductors 12 and 13, a plug 14, conductors 15 and 16, and a switch 17.

The sound grooves are adapted to be embossed in the record by means of an electrically actuated recording head 18 arranged to swing over the turntable 10 and being driven in this swinging movement by power driven mechanism, not shown. A suitable mechanism for this purpose was disclosed in my prior Patent No. 2,133,596, dated October 18, 1938. The sound vibrations received by the apparatus are reproduced in the form of a spiral groove in the disk record 24 by means of an embossing stylus 19 carried by the recording head 18, the latter being responsive to an electrical circuit which includes a microphone 20, a pair of conductors 21, a vacuum tube amplifier 22, and a pair of conductors 23. The recording head 18 is of a conventional type, and is adapted to rest upon the surface of a disk record 24 with a pressure of about four ounces.

The disk record 24 is preferably made from a thin flexible metal, such as sheet aluminum, having a thickness of less than .015", and preferably being previously annealed at a temperature of approximately 300 degrees F. to soften it and relieve it of all strains. The resultant disk 24 may be termed "semi-rigid," when compared with the conventional hard rigid disks previously employed, which were generally at least .030" in thickness and unannealed. The diameter of the disk 24 may be chosen as desired, and preferably should be such that the record will not buckle during handling or recording. For example, if a disk .006" in thickness is used, it has been found that for most efficient results the record should not exceed 7 inches in diameter.

Figure 4:
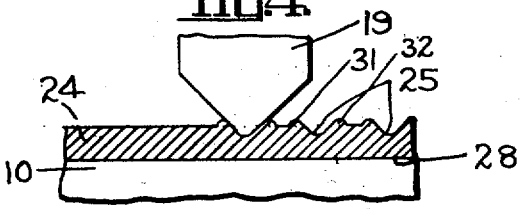
Figure 4 is a greatly enlarged sectional view of the disk record, turntable and stylus in operating position.

In order to drive the thin semi-rigid annealed aluminum disk record 24 while being embossed with sound grooves 25 (Fig. 4) without appreciable warping, the center spindle 26 of the turntable 11 is interlocked with the center opening 27 in said record. For this purpose the spindle 26 is made square in cross-section, and fits snugly within the opening 27 which is also made of the same square shape. The turntable 10 is provided with a flat, smooth, hard and rigid top surface 28, thus preventing the embossing stylus from producing warpage in the record 24 during the recording operation.

In order to produce more shallow grooves which may be more closely spaced (such as 160–200 grooves to the inch) than was previously possible, the pressure of the embossing stylus on the record should preferably be about 4 ounces, as compared to the high recording pressures (10–16 ounces) formerly employed.

If the record embossed in accordance with the apparatus herein disclosed were played back in the usual form of reproducing machine employing high pickup pressure and the hard metal or sapphire needles, the grooves would be rapidly torn and the record irreparably damaged.

Applicant's thin soft metal records may, however, be readily reproduced without injury when played back on a reproducing apparatus, such as that shown in applicant's copending application, Serial No. 74,919 for Phonograph reproducers, filed April 17, 1936, Patent No. 2,141,804, issued December 27, 1938. The apparatus disclosed in that application employed a low inertia pickup with the usual hard sapphire needle which exerts less than one-half ounce pressure on the record, and consequently, the wear on the grooves is negligible. Moreover, the low inertia pickup described in that patent permits the sound tracks to be readily followed by the needle without jumping grooves or repeating of grooves.

Figure 5:
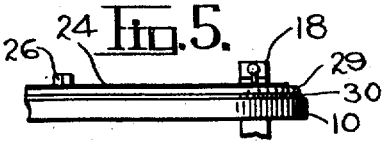
Figure 5 illustrates a fragmentary side view of a modified form of the invention employing a rigid record supporting plate resting on the usual turntable felt cushion.

In the modified form of the invention shown in Figure 5, instead of supporting the disk record 24 directly on the turntable top 28, as in the first form, a smooth rigid plate 29 is employed and is adapted to rest upon the usual felt cushion pad 30 which is glued or cemented to the turntable 10.

One advantage of the present invention is that when recording with either form of apparatus herein disclosed, the stylus 19 will emboss or "plow" a sound groove 25 in the surface of either side of the disk record 24 without appreciable warping.

In operation, the stylus 19 forces up a pair of lateral ribs 31 and 32, which define the side borders of the sound groove and materially reinforce the stiffness of the record.

If desired, the blank disk record 24 may have a ring-shaped marking area 33 etched upon its surface within the sound grooves for permitting the user to make any desired indicia or memoranda thereon with a pencil. Three rectangular shaped marking portions 34, 35 and 36 may also be etched on the record for receiving any other desired indicia pertaining to the sounds recorded thereon.

It has also been found that if desired, the operator may write directly across the sound grooves with a pencil without harming said grooves or affecting the reproduction of the sounds recorded thereon.

A further advantage of the present invention is that it permits the use of extremely thin record disks which are inexpensive to manufacture, and may be readily filed away in a small space, requiring no more filing room than a sheet of paper of average thickness. This is of particular value when the record is used for receiving dictation of correspondence, in which case the thin record may be clipped to the copy of the letter transcribed therefrom.

While there have been disclosed in this specification two forms in which the invention may be embodied, it is to be understood that these forms are shown for the purpose of illustration only, and that the invention is not to be limited to the specific disclosures, but may be embodied and modified in various other forms without departing from its spirit. In short, the invention includes all the modifications and embodiments coming within the scope of the following claims.

Having thus fully described the invention, what is claimed as new and for which it is desired to secure Letters Patent is:

1. In a sound recording apparatus, a disk record of thin flexible semi-rigid material of less than .015" in thickness, a flat hard surfaced plate for directly receiving and rigidly supporting said record, a rotating center spindle associated with said plate and having a driving connection with said record, and a swinging arm located above said record and having a cutting head for indenting laterally undulating helical grooves in said record without substantial warping.

2. In a sound recording apparatus, a disk record of thin flexible semi-rigid soft annealed aluminum of less than .015" in thickness, a flat hard surfaced plate for directly receiving and rigidly supporting said record, a rotating center spindle associated with said plate and having a driving connection with said record, and a swinging arm located above said record and having a cutting head for indenting laterally undulating helical grooves in said record without substantial warping.

3. In a sound recording apparatus having a movable stylus-carrying recording arm, a disk record of thin flexible semi-rigid material having a thickness between .006 inch and .030 inch, a hard surfaced rotatable plate directly receiving and rigidly stationarily supporting said record, a center driving spindle for said record normal to said plate, and means forming a driving connection between said spindle and said record.

4. In a sound recording apparatus having a movable stylus-carrying recording arm, a disk record of thin flexible semi-rigid material, a hard surfaced rotatable plate directly receiving and rigidly stationarily supporting said record, a center driving spindle for said record normal to said plate, and means forming a driving connection between said spindle and said record.

5. In a sound recording apparatus, a disk record of thin flexible semi-rigid material, a hard surfaced plate rotatable on an axis at right angles to said record for directly receiving said record, said record lying in contact with said plate throughout its surface and being stationarily supported thereby so as to rotate as a unit therewith, said plate having a driving connection with said record, and a movable arm carrying an indenting stylus to record a laterally undulating groove on the surface of said record.

LINCOLN THOMPSON.